(12) United States Patent
Noel et al.

(10) Patent No.: US 6,355,287 B2
(45) Date of Patent: *Mar. 12, 2002

(54) PACKAGED FOOD PRODUCT HAVING ADDED LIQUID

(75) Inventors: David C. Noel, Greer; James A. Mize, Jr., Simpsonville, both of SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,256

(22) Filed: Jun. 22, 1998

(51) Int. Cl.$^7$ .......................... B65D 30/02; B65B 25/06

(52) U.S. Cl. .................. 426/127; 426/129; 426/393; 426/130; 426/410; 426/415

(58) Field of Search ............................... 426/127, 129, 426/130, 113, 393, 415, 410; 428/34.9, 35, 35.7, 439, 218, 474

(56) References Cited

U.S. PATENT DOCUMENTS

| | | | | |
|---|---|---|---|---|
| 3,645,992 A | * | 2/1972 | Elston | 526/169.2 |
| 4,059,667 A | | 11/1977 | Pangonis | 264/289 |
| 4,064,296 A | | 12/1977 | Bornstein et al. | 428/35 |
| 4,120,716 A | | 10/1978 | Bonet | 156/272 |
| 4,226,826 A | | 10/1980 | Motegi et al. | 264/235.8 |
| 4,278,738 A | | 7/1981 | Brax et al. | 428/515 |
| 4,335,069 A | | 6/1982 | Levy | 264/290.2 |
| 4,431,705 A | | 2/1984 | Kitagawa et al. | 428/476.1 |

(List continued on next page.)

FOREIGN PATENT DOCUMENTS

| | | |
|---|---|---|
| EP | 0 435 498 A2 | 7/1991 |
| EP | 0 707 957 A1 | 4/1996 |
| EP | 0 756 931 A2 | 2/1997 |
| WO | WO 90/03414 | 4/1990 |
| WO | WO 93/03093 | 2/1993 |
| WO | 97/13640 | * 4/1997 |

OTHER PUBLICATIONS

ASTM 2732, "Standard Test Method for Unrestrained Linear Thermal Shrinkage of Plastic Film and Sheeting", 1989, pp. 368–371.

ASTM 2838, "Standard Test Method for Shrink Tension and Orientation Release Stress of Plastic Film and Thin Sheeting", 1995, pp. 119–122.

"Injected Pork is a Winner", Steve Bjerklie, M&S Merchandising, Mar./Apr. 1998, pp. 27–28.

Journal of Polymer Science, "Determination of Branching Distributions in Polyethylene and Ethylene Copolymers", Wild et al., 1982, vol. 20, pp. 441–455.

*Primary Examiner*—Nina Bhat
(74) *Attorney, Agent, or Firm*—Rupert B. Hurley Jr.

(57) ABSTRACT

A packaged product comprises a boneless food product comprising at least one member selected from the group consisting of meat and cheese. The food product has added liquid thereon, for example brine which has been injected into (and is exuding from) a meat product, or brine in which cheese has been soaking. The film article surrounds the boneless food product, and is in contact with both the boneless food product and the added liquid. The packaged product exhibits a Standard Drop Test failure rate of less than 60 percent. A packaging process involves placing the boneless food product into a packaging article, which may be a bag, pouch, or casing, the boneless food product having added liquid thereon. The added liquid on the surface of the meat, together with juice from the meat, forms a liquid blend which deposits on an inside surface of the packaging article which is to be sealed. The packaging article is then sealed across an open end thereof, the seal being made through the liquid blend on the inside surface of the meat product. The resulting packaged product exhibits a Standard Drop Test failure rate of less than 60 percent.

12 Claims, 3 Drawing Sheets

U.S. PATENT DOCUMENTS

| | | | |
|---|---|---|---|
| 4,448,792 A | * 5/1984 | Schirmer | 426/113 |
| 4,544,722 A | 10/1985 | Giddings et al. | 526/264 |
| 4,617,241 A | * 10/1986 | Mueller | 428/520 |
| 4,626,397 A | 12/1986 | Bose | 264/565 |
| 4,680,207 A | 7/1987 | Murray | 428/35 |
| 4,755,402 A | * 7/1988 | Oberle | 428/43.9 |
| 4,833,024 A | 5/1989 | Mueller | 428/518 |
| 4,863,784 A | * 9/1989 | Lustig et al. | 428/218 |
| 4,871,561 A | * 10/1989 | Parker | 426/281 |
| 4,879,430 A | 11/1989 | Hoffman | 428/35.1 |
| 4,988,465 A | * 1/1991 | Lustig et al. | 264/471 |
| 5,023,143 A | * 6/1991 | Nelson | 428/516 |
| 5,206,075 A | 4/1993 | Hodgson, Jr. | 428/216 |
| 5,213,900 A | * 5/1993 | Friedrich | 428/474.4 |
| 5,241,031 A | 8/1993 | Mehta | 526/348.1 |
| 5,256,428 A | * 10/1993 | Lustig et al. | 426/127 |
| 5,272,236 A | 12/1993 | Lai et al. | 526/348.5 |
| 5,278,272 A | 1/1994 | Lai et al. | 526/348.5 |
| 5,328,743 A | 7/1994 | Wynne et al. | 428/105 |
| 5,635,261 A | * 6/1997 | Georgelos et al. | 428/35.4 |
| 6,146,726 A | 11/2000 | Yoshii et al. | 428/35 |

* cited by examiner

PACKAGED FOOD PRODUCT HAVING ADDED LIQUID

FIELD OF THE INVENTION

The present invention relates to a packaged product in which an article, such as a bag, pouch, or casing, is used to package a product, such as food. The invention also relates to a process for making the packaged product according to the present invention.

BACKGROUND OF THE INVENTION

Injecting fresh meat with liquid, such as brine, is a means to tenderize the meat. The brine interacts with the muscle proteins, with the resulting liquid mixture exuding from the meat. During pack aging, the liquid which is on the surface of such injected meat products is a blend of the injected brine, muscle proteins, and natural juices and blood from the meat product. This liquid blend tends to smear onto the packaging film in the region to be sealed. The liquid blend is difficult to seal through. We have analyzed the seal strength of seals made under various conditions, and have discovered that the strength of seals made through the liquid blend can be even more than 80% less than the strength of seals made without the liquid blend being present in the seal area while the seal is made.

While some processors have successfully solved this weak-seal problem with equipment and line layouts which prevent the liquid blend from depositing on the seal area, other processors continue to have significant problems. Moreover, it has been found that high-shrinking bags exacerbate the seal failure problem That is, as the bag shrinks, the seal contacts the product which puts pressure on the seal, which can cause seal failure as the seal shrinks tightly up against the product.

One solution to the seal failure problem has been to provide an oversized shrink bag, so that the seal is made far enough from the product that the shrinkage of the bag does not result in the seal contacting the product within the bag. Although this may reduce the seal failure problem, it causes other problems. More particularly, it produces a packaged product of lesser aesthetic value due to excess film extending outward from the product being packaged. Secondly, the excess film provides an envelope which tends to collect juices from the meat product, which are unsightly and also exhibit an accelerated spoilage rate relative to the remainder of the meat product. It would also be desirable to avoid the seal failure problem while also avoiding the problems of diminished aesthetic appearance due to excess film, unsightly juice accumulation in the envelope of the excess film, and reduced shelf life due to accelerated spoilage rates caused by the juice which accumulates in the envelope of the excess film. The inventors of the present invention have arrived at a solution to these problems.

SUMMARY OF THE INVENTION

We have discovered that seal failure rates can be dramatically reduced for the packaging of a boneless meat product in which the meat has been injected with brine, without using an oversized bag and while providing a package in which the film is shrunk tightly against the meat product. We have discovered that bags made from particular films can be sealed through a brine-containing liquid blend, with significantly fewer seal failures even after the film is shrunk tightly against the boneless meat product. Moreover, it has been found that the use of lower shrink tension and/or lower free shrink can assist in reducing the seal failure due to the seal pulling down tightly against the product being packaged during shrinkage of the film after it is sealed around the product. Our invention enables us to package a product using a bag which is sized closer to the size of the product, thereby providing a final packaged product with an appearance which is of greater aesthetic appeal, i.e., versus the use of an oversized bag. Using a highly abusive test, we have assessed a seal failure rate of about 66 percent using bags which are currently in commercial use for the packaging of brine-injected boneless pork products. However, through the use of bags made from films of particular polymers (especially metallocene-catalyzed ethylene/alpha-olefin copolymers in the seal layer), as well as by providing the film with a relatively low free shrinkage (and/or substantially lesser shrink tension) in a direction which, in general, is perpendicular to the seal made through the liquid blend, we have discovered that we can reduce the seal failure rate to a level as low as 26 percent, using the same highly abusive test. This is a 60 percent reduction in seal failure rate, using a test we believe to be significantly more abusive than the actual conditions of use of the packaged products. In view of the substantial improvement in seal integrity during our highly abusive testing, we believe that in commercial use our packaged products will exhibit a seal failure rate which is a substantial improvement over the seal failure rate currently being experienced in the commercial market.

As a first aspect, the present invention is directed to a packaged product comprising (A) a boneless food product comprising at least one member selected from the group consisting of meat and cheese, the food product having a free liquid additive thereon; and (B) a film article which is both surrounding and in contact with both the food product and the free liquid. The packaged product exhibits a Standard Drop Test failure rate of less than 60 percent, more preferably, less than 55 percent; still more preferably, less than 50 percent; yet still more preferably, less than 45 percent; still more preferably, less than 40 percent; still more preferably, less than 35 percent; still more preferably, less than 30 percent.

Preferably, the film article comprises a heat-shrinkable film. Preferably, the film is a multilayer film comprising a seal layer comprising a homogeneous ethylene/alpha-olefin copolymer. Preferably, the film has a thickness of from about 1.5 to 3 mils; more preferably, from about 1.8 to 2.7 mils; still more preferably, from about 2 to 2.4 mils. Preferably, the film has a free shrink of from about 15 to 60 percent in at least one direction; more preferably, from about 20 to 50 percent. Preferably, the film has a shrink tension of from about 50 to 350 pounds per square inch (i.e., "psi") in a first direction, and from about 300–1000 in a second direction; more preferably, from about 100 to 200 psi the first direction, and from about 360 to 600 psi in the second direction. Shrink tension is measured in accordance with ASTM D 2838, the entirety of which is hereby incorporated by reference thereto.

If the film article is an end-seal bag, preferably the first direction is the machine direction (i.e., longitudinal direction), so that a seal made through the liquid blend is forced against the product by the shrink tension in the first direction. Likewise, if the film article is a side-seal bag, preferably the first direction is the transverse direction. Preferably, the second direction has a shrink tension of at least about 120 percent of the shrink tension of the first direction; more preferably, from about 150 to 2000 percent of the shrink tension of the first direction; still more preferably, from about 150 to 350 percent of the shrink tension of the first direction; and, yet still more preferably, from about 150 to 300 percent of the shrink tension of the second direction.

Preferably, the multilayer film has a seal layer comprising at least one member selected from the group consisting of polyolefin, polyamide, polyester, polyvinyl chloride, and ionomer; more preferably, homogeneous ethylene/alpha-olefin copolymer, ethylene/unsaturated ester copolymer (especially ethylene/vinyl acetate copolymer), and ionoiner. Preferably, the seal layer comprises homogeneous ethylene/alpha-olefin copolymer in an amount of at least about 90 weight percent. A particularly preferred seal layer comprises homogeneous ethylene/alphia-olefin copolymer in an amount of about 80 percent, based on layer weight, and linear low density polyethylene in an amount of about 20 percent, based on layer weight. Preferably, the multilayer film further comprises an $O_2$-barrier layer, which in turn preferably comprises at least one member selected from the group consisting of ethylene/vinyl alcohol copolymer, polyvinylidene chloride (PVDC), polyalkylene carbonate, polyamide, polyethylene naphthalate, polyester, polyacrylonitrile. Preferably, the film comprises a crosslinked polymer network, which is preferably obtained by irradiation of one or more layers of the film. If the multilayer film comprises an $O_2$-barrier layer, preferably the film further comprises one or more adhesive layers (i.e., "tie" layers) to enhance interlayer adhesion of the various film layers to one another.

Preferably, the free liquid additive comprises brine. Preferably, the brine is present in an amount of from about 1 percent to 30 percent, based on the weight of the product; more preferably, from about 5 to 25 percent, still more preferably, from about 6 to 20 percent, yet still more preferably, from about 10 to 12 percent, or from about 16 to 18 percent. Preferably, the food product comprises meat. Preferably, the meat product comprises at least one member selected from the group consisting of poultry, pork, beef, lamb, goat, horse, and fish; more preferably, at least one member selected from the group consisting of poultry, pork, beef, and lamb; still more preferably, at least one member selected from the group consisting of pork and beet, yet still more preferably, brine-injected pork.

As a second aspect, the present invention is directed to a packaging process comprising: (A) making a packaging article having an open top, (B) placing into the packaging article a boneless food product having an added liquid thereon, and (C) heat sealing across the open top of the packaging article. The packaging article comprises at least one member selected from the group consisting of a bag, a pouch, and a casing. When being placed into the packaging article, the boneless food product deposits the liquid blend onto a region of an inside surface of the packaging article before the packaging article is sealed across the top thereof. The liquid blend comprises the added liquid. Upon sealing across the top of the packaging article and through the liquid blend, a packaged product is formed. The packaged product exhibits a Standard Drop Test failure rate of less than 60 percent.

Preferably, the process further comprises evacuating atmosphere from within the packaging article after the boneless food product is placed into the packaging article but before the heat sealing across the open top of the packaging article. Preferred films, food products, and added liquids are as set forth above in the first aspect of the present invention. Preferably, brine is injected into a boneless meat product before the meat product is placed into the packaging article. Preferably, the packaging article comprises at least one member selected from the group consisting of an end-seal bag, a side-seal bag, a casing, and a pouch, with the first direction being parallel to a length of the article, and the second direction being perpendicular to the length of the article. If the first direction is a machine direction and the second direction is a transverse direction, preferably the article is an end-seal bag, casing, or pouch; if the first direction is the transverse direction and the second direction is the machine direction, preferably the article is a side-seal bag. If the packaging article is a casing, it can be either seamless or backseamed. If the packaging article is a pouch, it can be an L-seal pouch or a U-seal pouch.

As a third aspect, the present invention is directed to a packaged product comprising a bone-in meat product having a free liquid additive thereon, and a film article which is both surrounding and in contact with both the bone-in meat product and the free liquid. The packaged product exhibits a Standard Drop Test failure rate of less than 30 percent. Preferred films are as described above in the first and second aspects of the present invention. Preferred boneless meat products include bone-in beef, pork, lamb, foul (including chicken, turkey, etc.), fish, goat, and horse.

DETAILED DESCRIPTION OF THE INVENTION

Figure 1:
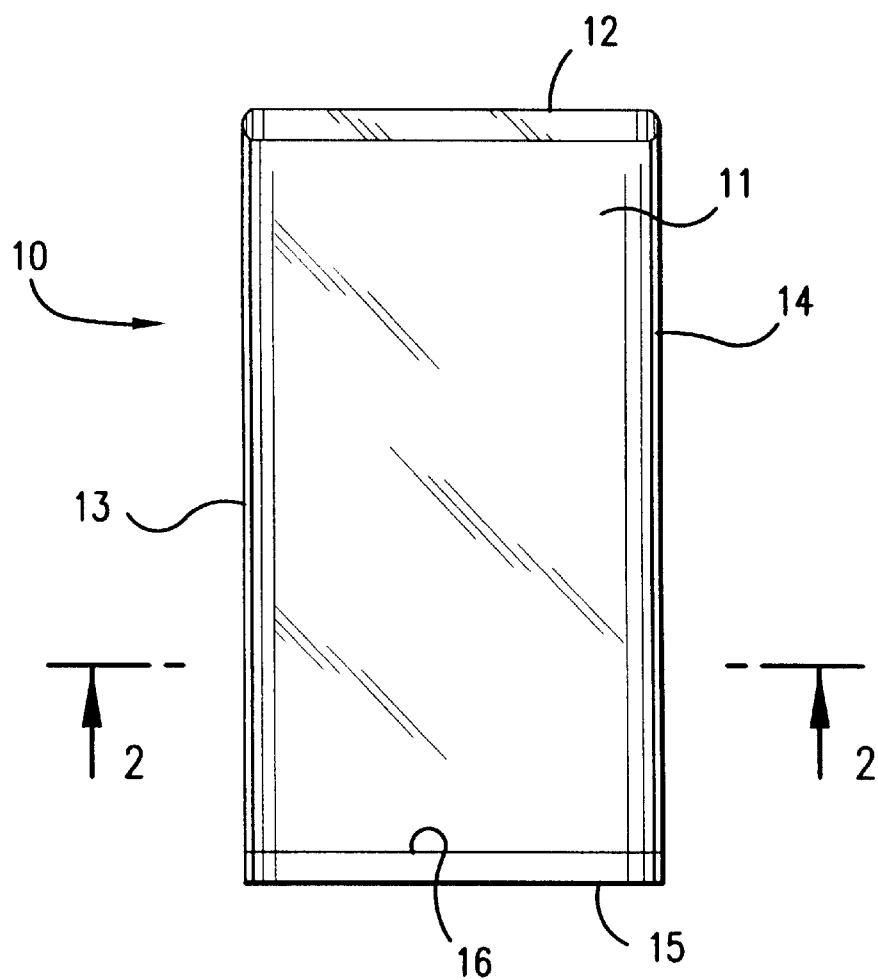
FIG. 1 illustrates an end-seal bag in lay-flat view, the bag being useful in a packaged product according to the present invention.

As used herein, the phrase "added liquid" refers to any liquid which is added to the food product, i.e., to the surface of the food product and/or within the structure of the food product. Examples of added liquids include brine, spice solutions, etc., injected into meat products, or used as soaking solutions for cheese. Ultimately, a portion of the added liquid remains within the food product at the time of packaging, while another portion of the added liquid exudes onto the surface (or remains on the surface) of the food product at the time of packaging. It is this added liquid which is on the surface of the food product, i.e., not within the food product, which is available to deposit on the inside surface of the packaging article which is to be sealed. The added liquid which deposits on the inside surface of the packaging article is responsible for the lowering of the strength of the resulting seal. In the present invention, brine is a preferred added liquid. As used herein, the term "brine" is inclusive of a solution of salt (e.g. sodium chloride) in water, regardless of whether or not other salts are also present, such as various phosphate-containing salts. Preferably, the brine contains salt in an amount of from about 3 to 20 percent, based on the weight of the solution.

As used herein, the phrase "free liquid" refers to liquid that is in a package which contains a food product, the liquid being in the package but not contained within the food product. That is, a free liquid is not being held within the boneless-food product. For example, "purge", which is known by those of skill in the art as being natural juice exuded from fresh meat, is considered to be a free liquid once the liquid exudes from the meat product. Moreover, liquid that is present on the surface of a meat product is also considered to be a free liquid. Still further, if a liquid (such as brine) is injected into a meat product and thereafter exudes from the meat product, the liquid that exudes from the meat product is likewise considered to be free liquid, even though the liquid is not a natural juice within the meat product.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

Preferably, the film according to the present invention comprises a total of from 3 to 20 layers, more preferably, from 4 to 12 layers; and still more preferably, from 5 to 9 layers. The multilayer film of the present invention can have any total thickness desired, so long as the film provides the desired properties for the particular packaging operation in which the film is used, especially desired drop test results.

As used herein, the phrases "seal layer", "sealing layer", "heat seal layer", and "sealant layer", refer to an outer layer, or layers, involved in the sealing of the film to itself, another layer of the same or another film, and/or another article which is not a film. Although it should also be recognized that up to the outer 3 mils of a film can be involved in the sealing of the film to itself or another layer, the phrase "seal layer," and the like, refer herein only to the outer layer(s) which is to be heat-sealed to itself, another film, etc. Any inner layers which contribute to the sealing performance of the film are herein designated as "seal-assist" layers. With respect to packages having only fin-type seals, as opposed to lap-type seals, the phrase "sealant layer" generally refers to the inside layer of a package, the inside layer being an outer layer which frequently also serves as a food contact layer in the packaging of foods. However, in a multilayer film, the composition of the other layers (within 3 mils of the inside surface) can also affect sealability and seal strength.

Sealant layers employed in the packaging arts have included the genus of thermoplastic polymer, which includes thermoplastic polyolefin, polyamide, polyester, polyvinyl chloride, and ionomer. Preferred polymers for the sealant layer include homogeneous ethylene/alpha-olefin copolymer, ethylene/vinyl acetate copolymer, and ionomer.

As used herein, the term "heat-seal," and the phrase "heat-sealing," refer to any seal of a first region of a film surface to a second region of a film surface, wherein the seal is formed by heating the regions to at least their respective seal initiation temperatures. The heating can be performed by any one or more of a wide variety of manners, such as using a heated bar, hot wire, hot air, infrared radiation, ultrasonic sealing, etc. Heat-sealing is the process of joining two or more thermoplastic films or sheets by heating areas in contact with each other to the temperature at which fusion occurs, usually aided by pressure. Heat-sealing is inclusive of thermal sealing, melt-bead sealing, impulse sealing, dielectric sealing, and ultrasonic sealing.

As used herein, the term "barrier," and the phrase "barrier layer," as applied to films and/or layers, is used with reference to the ability of a film or layer to serve as a barrier to one or more gases. In the packaging art, oxygen (i.e., gaseous $O_2$) barrier layers have included, for example, ethylene/vinyl alcohol copolymer, polyvinylidene chloride (PVDC), polyalkylene carbonate, polyamide, polyethylene naphthalate, polyester, polyacrylonitrile, etc., as known to those of skill in the art. However, in the present invention the $O_2$-barrier layer preferably comprises either EVOH or polyvinylidene chloride, the PVDC comprising a thermal stabilizer (i.e., HCl scavenger, e.g., epoxidized soybean oil) and a lubricating processing aid, which, for example, comprises one or more acrylates.

As used herein, the phrases "abuse layer", as well as the phrase "puncture-resistant layer", refer to any layer which serves to resist abrasion, puncture, and other potential causes of reduction of package integrity, as well as potential causes of reduction of package appearance quality. As used herein, the phrase "skin layer" refers to an outside layer of a multilayer film in packaging a product, this skin layer being subject to abuse.

As used herein, the term "core", and the phrase "core layer", as applied to multilayer films, refer to any internal layer which preferably has a function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "tie layer" refers to any internal layer having the primary purpose of adhering two layers to one another. In one preferred embodiment, tie layers can comprise any polymer having a polar group grafted thereon, so that the polymer is capable of covalent bonding to polar polymers such as polyamide and ethylene/vinyl alcohol copolymer. Preferred polymers for use in tie layers include, but are not restricted to, ethylene/unsaturated acid copolymer, ethylene/unlsaturated ester copolymer, anhydride-grafted polyolefin, polyurethane, and mixtures thereof.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, the phrase "food-contact surface" and "meat-contact surface" refers to an outer surface of a food-contact layer/meat-contact layer, this outer surface being in direct contact with the food/meat within the package.

As used herein, "EVOH" refers to ethylene/vinyl alcohol copolymer, i.e., polymerized ethylene vinyl alcohol. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50%, and more preferably, at least 85%.

Preferably, the EVOH comprises from about 28 to about 48 mole % ethylene, more preferably, from about 32 to about 44 mole % ethylene, and even more preferably, from about 38 to about 44 mole % ethylene.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the tern "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is usually obtained by "blowing" the film to produce a bubble. For such films, drawing is usually obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrases "heat-shrinkable," "heat-shrink," and the like, refer to the tendency of a film, generally an oriented film, to shrink upon the application of heat, i.e., to contract upon being heated, such that the size (area) of the film decreases while the film is in an unrestrained state. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained).

As used herein, the phrase "free shrink" refers to the percent dimensional change in a 10 cm×10 cm specimen of film, when subjected to selected heat (i.e., at a certain temperature), with the quantitative determination being carried out according to ASTM D 2732, as set forth in the 1990 Annual Book of ASTM Standards, Vol. 08.02, pp.368–371, which is hereby incorporated, in its entirety, by reference thereto.

As used herein, the phrase "heat-shrinkable" is used with reference to all films which exhibit a total free shrink (i.e., L+T) of at least 10 percent at 185° F. The multilayer film used in the present invention preferably has a total free shrink (i.e., L+T before shrinkage) of at least in 40 percent at 185° F. Moreover, the film preferably has a free shrink of at least 15 percent at 185° F. in the machine direction, and at least 15 percent at 185° F. in the transverse direction. "Total free shrink" is determined by summing the percent free shrink in the machine direction with the percentage of free shrink in the transverse direction. For example, a film which exhibits, at 185° F., 30 percent free shrink in the transverse direction and 20 percent free shrink in the machine direction, has a "total free shrink" at 185° F. of 50 percent.

The multilayer films of the invention can be annealed or heat-set to reduce the free shrink either slightly, substantially or completely.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. A film layer can consist of a single polymer (with or without non-polymeric additives), or can have still additional polymers together therewith, i.e., blended therewith.

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term copolymer is also inclusive of polymers produced by reaction, such as graft copolymer, block copolymer, and random copolymer.

As used herein, the term "polymerization" is inclusive of homopolymerization, copolymerizations, terpolymerizations, etc., and includes all types of copolymerizations such as random, graft, block, etc. Polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers to result in a copolymer. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

For addition polymers, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mers" derived from the monomers from which the copolymer is produced, e.g., a propylene/ethylene copolymer comprises propylene mer units and ethylene mer units.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER™ linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally have ($M_w/M_n$) of less than 2.7; preferably from about 1.9 to about 2.5; more preferably, from about 1.9 to about 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alphia-olefin copolymers have a CDBI greater than about 70%, i.e., a CDBI of from about 70% to about 99%. The homogeneous ethylene/alpha-olefin copolymers in the multilayer films to be used in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to about 105° C. Preferably the homogeneous copolymer has a DSC peak $T_m$ of from about 80° C. to about 100° C. As used herein, the phrase "essentially single melting point" means that at least about 80%, by weight, of the material corresponds to a single $T_m$ peak at a temperature within the range of from about 60° C. to about 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can be prepared by the copolymerization of ethylene and any one or more alpha-olefins. Preferably, the alpha-olefin is a $C_3-C_{20}$ alpha-monoolefin, more preferably, a $C_4-C_{12}$ alpha-monoolefin, still more preferably, a $C_4-C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the terin "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/ unsaturated ester copolymer, ethylene/unsaturated acid copolymer, (especially ethyl acrylate copolymer, ethylenle/ butyl acrylate copolymer, ethylene/methyl acrylate copolymer, ethylene/acrylic acid copolymer, ethylene/ methiacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE), and homogeneous polymers such as metallocene-catalyzed EXACT™ linear homogeneous ethylene/alpha olefin copolymer resins obtainable from the Exxon Chemical Company, of Baytown, Texas, and TAFMER™ linear homogeneous ethylene/ alphia-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY™ resins, are also included as another type of homogeneous ethylene/alpha-olefin copolymer useful in the present invention.

The ethylene/alpha-olefin copolymer comprises a copolymer resulting from the copolymerization of from about 80 to about 99 weight percent ethylene and from 1 to about weight percent alpha-olefin. Preferably, the ethylene/alpha-olefin copolymer comprises a copolymer resulting from the copolymerization of from about 85 to about 95 weight percent ethylene and from about 5 to about 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. The phrase "outside layer" also is used with reference to the outermost layer of a plurality of concentrically arranged layers coextruded through an annular die.

As used herein, the term "adhered" is inclusive of films which are directly adhered to one another using a heat-seal or other means, as well as films which are adhered to one another using an adhesive which is between the two films. As used herein, the phrase "directly adhered", as applied to layers, is defined as adhesion of the subject layer to the object layer, without a tie layer, adhesive, or other layer therebetween. In contrast, as used herein, the word "between", as applied to a layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

At least a portion of the multilayer film of the present invention is preferably irradiated to induce crosslinking. In the irradiation process, the film is subjected to one or more energetic radiation treatments, such as corona discharge, plasma, flame, ultraviolet, X-ray, gamma ray, beta ray, and high energy electron treatment, each of which induces cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosllinking, a suitable radiation dosage of high energy electrons is employed, preferably using an electron accelerator, with a dosage level being determined by standard dosimetry methods. Other accelerators such as a Van de Graaf or resonating transformer may be used. The radiation is not limited to electrons from an accelerator since any ionizing radiation may be used. The ionizing radiation can be used to crosslink the polymers in the film. Preferably, the film is irradiated at a level of from about 30 kGy to about 207 kGy, more preferably from about 30 kGy to about 140 kGy. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. The films of this invention can be corona-treated in a preferred embodiment.

Various combinations of layers can be used in the formation of the multilayer films for use in the present invention. Only 4-, 6-, and 7-layer preferred embodiments are provided here as illustrations. The multilayer films useful in the present invention can also comprise additional layers or fewer layers. Thus, modifications and variations may be utilized without departing from the principles and scope of the invention, as those skilled in the art will readily understand.

Preferably, the film is produced by casting an annular tape which is thereafter oriented at least 2:1 in at least 1 direction; more preferably, from about 2:1 to about 10:1 in at least one direction; still more preferably, at least 2.5:1 to 5:1 in at least one direction.

Figure 2:
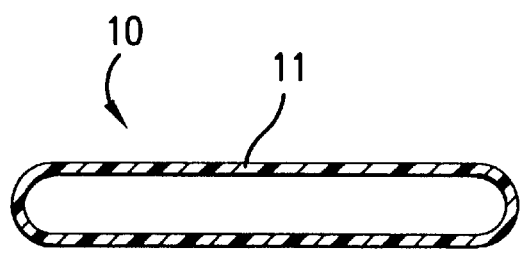
FIG. 2 illustrates a cross-sectional view taken through section 2—2 of FIG. 1.

FIG. 1 is a schematic of a preferred end seal bag 10, in a lay-flat position, this bag being in accord with the present invention; FIG. 2 is a cross-sectional view of bag 10 taken through section 2—2 of FIG. 1. Viewing FIGS. 1 and 2 together, bag 10 comprises bag film 11, top edge 12 defining an open top, first bag side edge 13, second bag side edge 14, bottom edge 15, and end seal 16.

Figure 3:
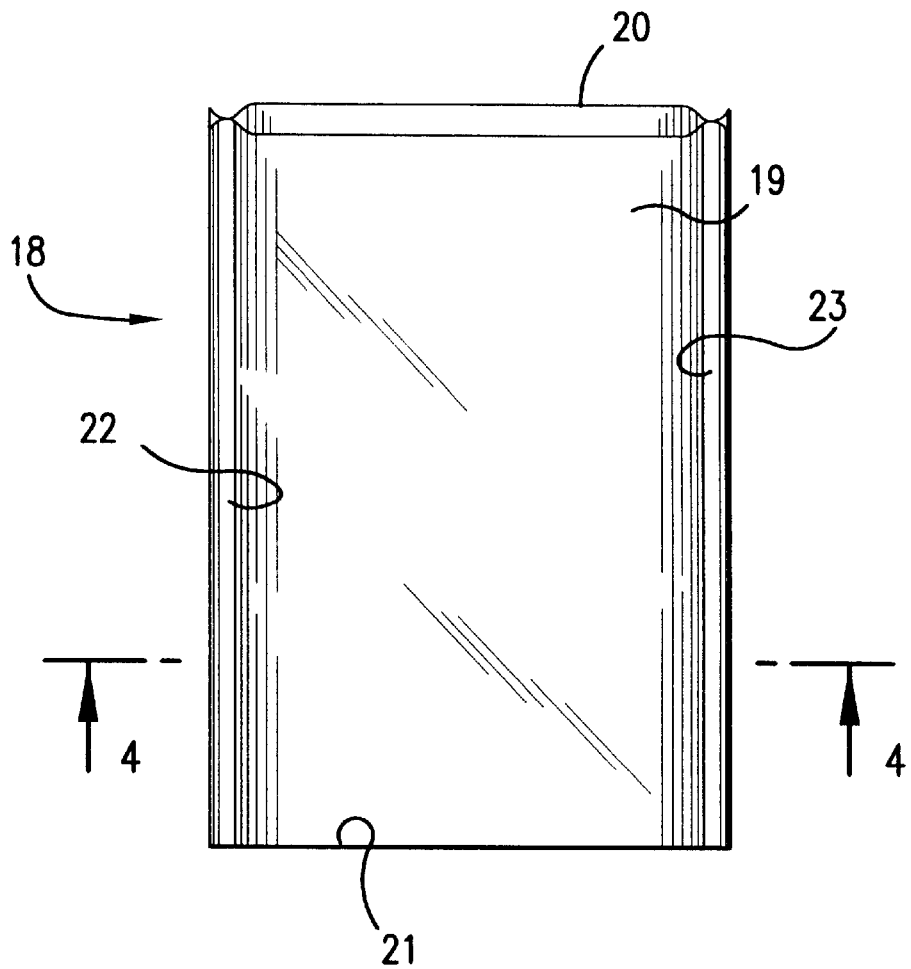
FIG. 3 illustrates a side-seal bag in lay-flat view, the bag being useful in a packaged product according to the present invention.
Figure 4:
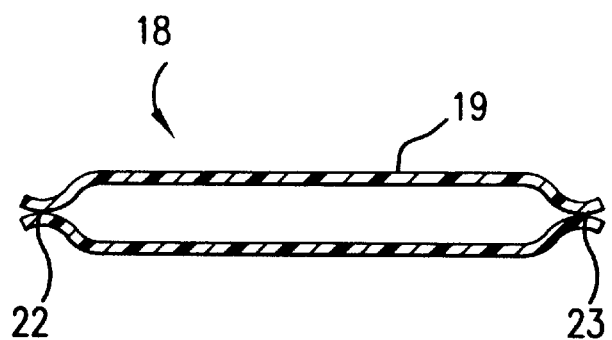
FIG. 4 illustrates a cross-sectional view taken through section 4—4 of FIG. 3.

FIGS. 3 and 4 illustrate side-seal bag 18. FIG. 3 illustrates a schematic of side seal bag 18, in a lay-flat view, FIG. 4 illustrates a cross-sectional view taken through section 4—4 of FIG. 3. With reference to FIGS. 3 and 4 together, side seal bag 18 is comprised of bag film 19, top edge 20 defining an open top, bottom edge 21, first side seal 22, and second side seal 23.

In addition to the bag-type packaging articles illustrated in FIGS. 1–4 and described above, the packaging article can also be a casing made from a flexible packaging film, i.e., a film tubing. The casing can be a seamless casing or a backseamed casing, the latter being a casing having a seam running the length of the tubing. Backseamed casings include both lap-seal backseamed casings as well as butt-sealed backseamed casings, the latter utilizing a butt-seal tape which is sealed to the casing film, as is known to those of skill in the art. Another type of packaging article which can be utilized is generally referred to as a "pouch," which is generally made from two rectangular pieces of flexible packaging film of the same dimensions, which are sealed to one another along 3 edges, leaving the unsealed fourth edges to form the open top, into which a product can be inserted.

Figure 5:
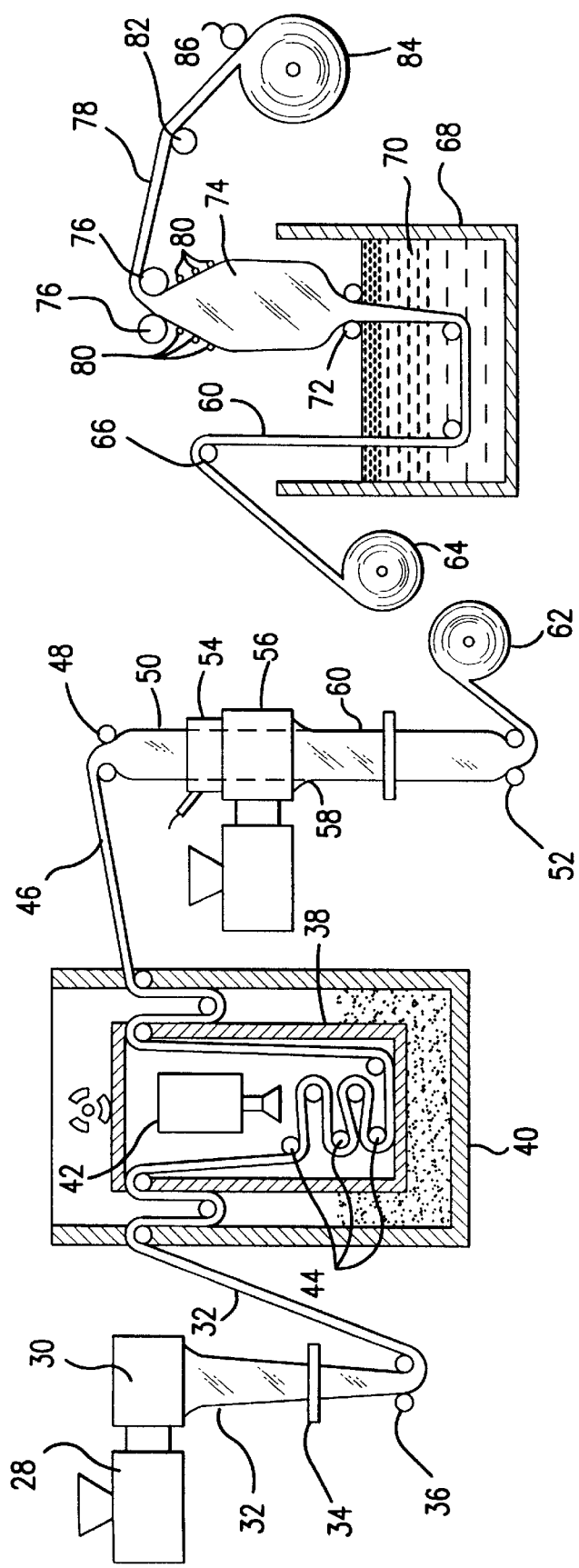
FIG. 5 illustrates a schematic view of a preferred process for making a multilayer film useful in the packaged product of the present invention.

FIG. 5 illustrates a schematic view of a first preferred process for making films according to the present invention. As illustrated in FIG. 5, solid polymer beads (not illustrated) are fed to a plurality of extruders 28 (for simplicity, only one extruder is illustrated).

Inside extruders 28, the polymer beads are forwarded, melted, and degassed, following which the resulting bubble-free melt is forwarded into die head 30, and extruded through an annular die, resulting in tubing 32 which is preferably about 10 to 20 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 40 kGy to about 120 kGy.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially circular tubing without significant transverse orientation, i.e., without stretching.

Slightly inflated, irradiated tubing 46 is passed through vacuum chamber 54, and thereafter forwarded through coating die 56. Annular coating stream 58 is melt extruded from coating die 56 and coated onto slightly inflated, irradiated tube 50, to form two-ply tubular film 60. Coating stream 58 preferably comprises an $O_2$-barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 60 is wound up onto windup roll 62.

Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes 25 into hot water bath tank 68 containing hot water 70. The now collapsed, irradiated, coated tubular film 60 is immersed in hot water 70 (preferably at a temperature of from about 185° F. to 210° F.) for a period of from about 10 to about 100 seconds, i.e., for a time period in order to bring the film up to the desired temperature for biaxial orientation.

Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5 to about 1:6, and drawn at a ratio of from about 1:1.5 to about 1:6; more preferably, the stretching and drawing are each performed a ratio of from about 1:2 to about 1:4. The result is a biaxial orientation of from about 1:2.25 to about 1:36, more preferably, from about 1:4 to about 1:16. While bubble 74 is maintained between pinch rolls 72 and 76, blown tubing 78 is collapsed by rollers 80, and thereafter conveyed through pinch rolls 76 and across guide roll 82, and then rolled onto wind-up roll 84. Idler roll 86 assures a good wind-up.

The invention is illustrated by the following examples, which are provided for the purpose of representation, and are not to be construed as limiting the scope of the invention. Unless stated otherwise, all percentages, parts, etc. are by weight.

EXAMPLES 1–4

Four different ethylene-based heat-shrinkable, coextruded multilayer films were prepared by a process as schematically illustrated in FIG. 5 (described above). Each of the films was converted into a plurality of end-seal bags. For each of the four different bag types, some of the bags were sealed shut in the absence of any product being placed within the bag. For the remaining bags of each type, a brine-injected pork product was placed within the bag, with the brine/meat juice blend, being on the surface of the meat product, deposits on the area to be the area to be sealed. The average seal strengths of the bags were as follows:

TABLE 1

| Film Identity | Avg. Seal Strength of Clean Bag Seal (lb/in) | Avg. Seal Strength of Bag with Liquid Blend on Seal Area (lb/in) | % Reduction in Seal Strength Due to Liquid Blend on Seal Area |
|---|---|---|---|
| 1 | 10.92 | 2.73 | 75.0 |
| 2 | 10.16 | 1.62 | 84.1 |
| 3 | 11.48 | 3.50 | 69.5 |
| 4 | 9.45 | 3.35 | 64.6 |

The results in Table 1 clearly establish that seal strength is greatly reduced if the seal is made through brine in admixture with pork purge. The clean bag seal strengths of from 9.45 to 11.48 lb/in establishes that the chemical composition of the film was not responsible for the low seal strength obtained in the presence of the combination of brine and purge. Taken in total, the results indicate that the combination of purge and brine was responsible for lowering the seal strength in an amount of from about 64.6% to about 84.1%.

EXAMPLE 5

A 7-layer, partially-irradiated, extrusion-coated, biaxially oriented, heat-shrinkable, $O_2$-barrier film was produced by a process as illustrated in FIG. 5, described above. In the process, a tape containing the first, second, and third layers was coextruded as a substrate which was irradiated to a level of 71 kGy. Thereafter, the fourth, fifth, sixth, and seventh layers were extrusion coated onto the irradiated substrate. In this manner, the layer comprising PVDC-MA was not subjected to irradiation. The orientation of the resulting 22 mil thick tape, i.e., to form the oriented, heat-shrinkable film, was carried out by immersing the tape in hot water at 197° F., followed by immediate immersion in hot water at 192° F., followed immediately by orientation. The tape was oriented 3.5× in the longitudinal direction, and 3.5× in the transverse direction. The resulting film had a thickness of 2.2 mils. The film had a free shrink at 185° F. in the longitudinal direction of 37 percent, and a free shrink at 185° F. in the transve direction of 53 percent. The various layers of the tape had the following composition and thickness:

TABLE 2

| Layer Designation | Layer Chemical Identity | Layer Thickness (mils) |
|---|---|---|
| First | Homogeneous ethylene/alpha-olefin copolymer #1 | 5 |
| Second | 90% homogeneous ethylene/alpha-olefin #2 10% rubber | 9 |
| Third | EVA #1 | 1 |
| Fourth | PVDC/MA | 2 |
| Fifth | EMA | 1 |
| Sixth | Homogeneous ethylene/alpha-olefin #2 | 2.5 |
| Seventh | Homogeneous ethylene/alpha-olefin #3 | 1.5 |

In Table 2 above, the identity of the resins used was as follows. First, "homogeneous ethylene/alpha-olefin #1" was AFFINITY® PL 1280 single site catalyzed, long chain branched ethylene/octene copolymer which had a density of 0.900 g/cc, and a melt index of 6.0 g/10 min, obtained from The Dow Chemical Company of Midland, Mich.

"Homogeneous ethylene/alpha-olefin #2" was DPF. 1150.01 single-site-catalyzed ethylene/octene copolymer which had a density of 0.901 g/cc, and a melt index of 0.9 g/10 min., and was obtained from The Dow Chemical Company of Midland, Mich.

"Homogeneous ethylene/alpha-olefin #3" was AFFINITY® PL 1850 single-site-catalyzed, long chain branched, ethylene/octene copolymer which had a density of 0.902 g/cc, and a melt index of 3.0 g/10 min., and was obtained from The Dow Chemical Company of Midland, Mich.

"Rubber" was BUNA EP-T-2370P ethylene/propylene/diene (5-ethyledene 2-norbornene) resin which had a density of 0.867 g/cc, a melt index of 2.0 g/10 min, and which was obtained from Bayer Inc., Rubber Division, of Akron, Ohio.

"EVA #1" was LD-713.93 ethylene/vinyl acetate copolymer which had a vinyl acetate content of 15 percent, a density of 0.934 g/cc, and a melt index of 3.5 g/10 min., and which was obtained from the Exxon Chemical Company of Baytown, Tex.

"PVDC/MA" was a blend of: (a) 96% XU32034.06 polyvinylidene chloride/methyl acrylate copolymer which contained 91.5% PVDC and 8.5% methyl acrylate, obtained from The Dow Chemical Company, of Midland, Mich., (b) 2% PLAS CHEK® 775 epoxidized soy bean oil obtained from the Bedford Chemical Division of Ferro Corporation, of Bedford, Mass., and (c) 2% METABLEN® L-1000 butyl acrylate/methyl methacrylate/butyl methacrylate terpolymer having a density of 1.14g/cc and obtained from Elf Atochem NA, Inc., of Philadelphia, PA., the blend of (a), (b), and (c) had a density of 1.69 g/cc.

"EMA" was EMAC SP 1305™ ethylene/methyl acrylate copolymer having a density of 0.944 g/cc and a melt index of 2.0 g/10 min, and was obtained from the Chevron Chemical Company of Houston, Tex.

EXAMPLE 6

Another 7-layer partially-irradiated, extrusion-coated, biaxially oriented, heat-shrinkable, $O_2$-barrier film was produced in by the process as illustrated in FIG. 5, and in accordance with the description of Example 5, above. As is apparent from Table 3 below, the composition of each of the film layers was the same, but the thicknesses of the layers were different from the film of Example 5. The orientation of the resulting 17.6 mil thick tape, i.e., to form the oriented, heat-shrinkable film, was carried out by immersing the tape in hot water at 197° F., followed by immediate immersion in hot water at 192° F., followed immediately by orientation. The tape was oriented 2.8× in the longitudinal direction, and 3.5× in the transverse direction. The resulting film had a thickness of 2.2 mils. The film had a free shrink at 185° F. in the longitudinal direction of 36 percent, and a free shrink at 185° F. in the transverse direction of 48 percent. The various layers of the tape had the following composition and

TABLE 3

| Layer Designation | Layer Chemical Identity | Layer Thickness (mils) |
|---|---|---|
| First | Homogeneous ethylene/alpha-olefin copolymer #1 | 4 |
| Second | 90% homogeneous ethylene/alpha-olefin #2 10% rubber | 7.2 |
| Third | EVA #1 | 0.8 |
| Fourth | PVDC/MA | 1.6 |
| Fifth | EMA | 0.8 |
| Sixth | Homogeneous ethylene/alpha-olefin #2 | 2 |
| Seventh | Homogeneous ethylene/alpha-olefin #3 | 1.2 |

EXAMPLE 7

Another 7-layer partially-irradiated, extrusion-coated, biaxially oriented, heat-shrinkable, $O_2$-barrier film was produced in by the process as illustrated in FIG. 5, and in accordance with the description of Example 6, above, except that the orientation of the resulting 17.6 mil thick tape, i.e., to form the oriented, heat-shirinkable film, was carried out by immersing the tape in hot water at 205° F., followed by immediate immersion in hot water at 200° F., followed immediately by orientation. The tape was oriented 2.8× in the longitudinal direction, and 3.5× in the transverse direction. The resulting film had a thickness of 2.2 mils. The film had a free shrink at 185° F. in the longitudinal direction of 18 percent, and a free shrink at 185° F. in the transverse direction of 39 percent.

EXAMPLE 8

Another 7-layer partially-irradiated, extrusion-coated, biaxially oriented, heat-shrinkable, $O_2$-barrier film was produced in by the process as illustrated in FIG. 5, and in accordance with the description of Example 6, above, except that the orientation of the resulting 17.6 mil thick tape, i.e., to form the oriented, heat-shrinkable film, was carried out by immersing the tape in hot water at 202° F., followed by immediate immersion in hot water at 192° F., followed immediately by orientation. The tape was oriented 2.8× in the longitudinal direction, and 3.5× in the transverse direction. The resulting film had a thickness of 2.2 mils. The film had a free shrink at 185° F. in the longitudinal direction of 36 percent, and a free shrink at 185° F. in the transverse direction of 53 percent.

EXAMPLE 9

Another 7-layer partially-irradiated, extrusion-coated, biaxially oriented, heat-shrinkable, $O_2$-barrier film was produced in by the process as illustrated in FIG. 5, and unless otherwise indicated, in accordance with the description of Example 5, above. Table 4, below, sets forth the composition and relative thicknesses of each of the various layers of the film of this example. The orientation of the resulting 22 mil thick tape, i.e., to form the oriented, heat-shrinkable film, was carried out by immersing the tape in hot water at 197° F., followed by immediate immersion in hot water at 191° F., followed immediately by orientation. The tape was oriented 3.5× in the longitudinal direction, and 3.5× in the transverse direction. The resulting film had a thickness of 2.2 mils. The film had a free shrink at 185° F. in the longitudinal direction of 37 percent, and a free shrink at 185° F. in the transverse direction of 46 percent. The various layers of the tape had the following composition and thickness:

TABLE 4

| Layer Designation | Layer Chemical Identity | Layer Thickness (mils) |
|---|---|---|
| First | Homogeneous ethylene/alpha-olefin copolymer #1 | 5 |
| Second | 60% homogeneous ethylene/alpha-olefin #2 30% LLDPE#1 10% rubber | 9 |
| Third | EVA #1 | 1 |
| Fourth | PVDC/MA | 2 |
| Fifth | EMA | 1 |
| Sixth | Homogeneous ethylene/alpha-olefin #2 | 2.5 |
| Seventh | Homogeneous ethylene/alpha-olefin #3 | 1.5 |

In Table 4 above, "LLDPE #1 was DOWLEX® 2045.03 ethylene/octene copolymer which had a density of 0.920 g/cc, and a melt index of 1.1 g/10 min., and was obtained from The Dow Chemical Company of Midland, Mich.

EXAMPLE 10

A 4-layer partially-irradiated, extrusion-coated, biaxially oriented, heat-shrinkable, $O_2$-barrier film was produced by a process as illustrated in FIG. 5, described above. In the process, a tape containing the first and second layers was coextruded as a substrate which was irradiated to a level of 64 kGy. Thereafter, the third and fourth layers were extrusion coated onto the irradiated substrate. In this manner, the layer comprising PVDC-MA was not subjected to irradiation. The orientation of the resulting 25 mil thick tape, i.e., to form the oriented, heat-shrinkable film, was carried out by immersing the tape in a preheat water bath containing water at a temperature of 210° F., followed by immediate immersion in a hot water bath containing water also at 210° F., followed immediately by orientation. The tape was oriented 3.5× in the longitudinal direction, and 3.5× in the transverse direction. The resulting film had a thickness of 2.32 mils. The film had a free shrink at 185° F. in the longitudinal direction of 21 percent, and a free shrink at 185° F. in the transverse direction of 30 percent. The various layers of the tape had the following composition and thickness:

TABLE 5

| Layer Designation | Layer Chemical Identity | Layer Thickness (mils) |
|---|---|---|
| First | 80% homogeneous ethylene/alpha-olefin copolymer #1, and 20% LLDPE #2 | 5 |
| Second | 85% LLDPE#1 15% EBA | 12 |
| Third | PVDC/MA | 2 |
| Fourth | 90% EVA #2 10% HDPE | 6 |

In Table 5 above, "LLDPE #2" was ESCORENE® LL3003.32 ethylene/hexene copolymer which had a density of 0.9175 g/cc, and a melt index of 3.2 g/10 min., and was obtained from the Exxon Chemical Company of Baytown, Tex.

"EBA" was SP 1802 ethylene/butyl acrylate copolymer, having a butyl acrylate mer content of 18%, a density of 0.928 g/cc, and a melt index of 0.5 g/10 min, and was obtained from the Chevron Chemical Company, of Houston, Tex.

"EVA #2" was ESCORENE® LD-318.92 ethylene/vinyl acetate copolymer which had a vinyl acetate content of 9 percent, a density of 0.930 g/cc, and a melt index of 2.0 g/10 min., and which was obtained from the Exxon Chemical Company of Baytown, Tex.

"HDPE" was FORTiFLEX T60-500-119 high density polyethylene, having a density of 0.961 g/cc, and a melt index of 6.2 g/10 mim., and which was obtained from Solvay Polymers, Inc., of Houston, Tex.

EXAMPLE 11

A 7-layer partially-irradiated, extrusion-coated, biaxially oriented, heat-shrinkable, $O_2$-barrier film was produced by a process as illustrated in FIG. 5, described above. In the process, a tape containing the first, second, and third layers was coextruded as a substrate which was irradiated to a level of 71 kGy. Thereafter, the fourth, fifth, sixth, and seventh layers were extrusion-coated onto the irradiated substrate. In this manner, the layer comprising PVDC-MA was not subjected to irradiation. The orientation of the resulting 22.2 mil thick tape, i.e., to form the oriented, heat-shrinkable film, was carried out by immersing the tape in hot water at 197° F., followed by immediate immersion in hot water at 192° F., followed immediately by orientation. The tape was oriented 3.6× in the longitudinal direction, and 3.55× in the transverse direction. The resulting film had a thickness of 2.2 mils. The film had a free shrink at 185° F. in the longitudinal direction of 32 percent, and a free shrink at 185° F. in the transverse direction of 43 percent. The various layers of the tape had the following composition and thickness:

TABLE 6

| Layer Designation | Layer Chemical Identity | Layer Thickness (mils) |
|---|---|---|
| First | 80% homogeneous ethylene/alpha-olefin copolymer #1, and 20% LLDPE #2 | 4.9 |
| Second | 60% homogeneous ethylene/alpha-olefin #2 30% LLDPE#1 10% rubber | 9.0 |
| Third | EVA #1 | 1.0 |
| Fourth | PVDC/MA | 1.9 |
| Fifth | EMA | 1.0 |
| Sixth | Homogeneous ethylene/alpha-olefin #2 | 2.6 |
| Seventh | 85% homogeneous ethylene/alpha-olefin #3, and 15% LLDPE #1 | 1.8 |

EXAMPLE 12 (Comparative)

A 6-layer partially-irradiated, extrusion-coated, biaxially oriented, heat-shrinkable, $O_2$-barrier film was produced by a process as illustrated in FIG. 5, described above. In the process, a tape containing the first and second layers was coextruded as a substrate which was irradiated to a level of 64 kGy. Thereafter, the third, fourth, fifth, and sixth layers were extrusion-coated onto the irradiated substrate. In this manner, the layer comprising PVDC-MA was not subjected to irradiation. The orientation of the resulting 21.1 mil thick tape, i.e., to form the oriented, heat-shrinkable film, was carried out by immersing the tape in hot water at 193° F., followed by immediate immersion in hot water at 180° F., followed immediately by orientation. The tape was oriented 3.2× in the longitudinal direction, and 3.7× in the transverse direction. The resulting film had a thickness of 1.8 mils. The film had a free shrink at 185° F. in the longitudinal direction of 48 percent, and a free shrink at 185° F. in the transverse direction of 60 percent. The various layers of the tape had the following composition and thickness:

TABLE 7

| Layer Designation | Layer Chemical Identity | Layer Thickness (mils) |
|---|---|---|
| First | Homogeneous ethylene/alpha-olefin copolymer #1 | 5 |
| Second | EVA #1 | 8.4 |
| Third | PVDC/MA | 2.2 |
| Fourth | EMA | 1.0 |
| Fifth | Homogeneous ethylene/alpha-olefin #4 | 3.0 |
| Sixth | homogeneous ethylene/alpha-olefin #4, and 2% Antiblock Masterbatch | 1.5 |

In Table 7 above, "homogeneous ethylene/alpha-olefin #4" was AFFINITY® PF1140 single-site-catalyzed, long chain branched, ethylene/octene copolymer which had a density of 0.8965 g/cc, and a melt index of 1.6 g/10 Min., and was obtained from The Dow Chemical Company of Midland, Mich.

"Antiblock Masterbatch" was L-7118-AB antiblock masterbatch in which 20% talc was present in an AFFINITY® ethylene/alpha-olefin copolymer carrier, obtained from Bayshore Industrial of LaPorte, Tex., the masterbatch had a density of 1.039 and a melt index of 5.5 g/10 min.

EXAMPLE 13 (Comparative)

A 7-layer partially-irradiated, extrusion-coated, biaxially oriented, heat-shrinkable, $O_2$-barrier film was produced by a process as illustrated in FIG. 5, described above. In the process, a tape containing the first, second, and third layers was coextruded as a substrate which was irradiated to a level of 50 kGy. Thereafter, the fourth, fifth, sixth, and seventh layers were extrusion-coated onto the irradiated substrate. In this manner, the layer comprising PVDC-MA was not subjected to irradiation. The orientation of the resulting 23.8 mil thick tape, i.e., to form the oriented, heat-shrinkable film, was carried out by immersing the tape in hot water at 205° F., followed by immediate immersion in hot water at 195° F., followed immediately by orientation. The tape was oriented 3.5× in the longitudinal direction, and 4× in the transverse direction. The resulting film had a thickness of 1.93 mils. The film had a free shrink at 185° F. in the longitudinal direction of 1 percent, and a free shrink at 185° F. in the transverse direction of 45 percent. The various layers of the tape had the following composition and thickness:

TABLE 8

| Layer Designation | Layer Chemical Identity | Layer Thickness (mils) |
|---|---|---|
| First | 80% homogeneous ethylene/alpha-olefin copolymer #1, and 20% LLDPE #2 | 5.5 |
| Second | EVA #3 | 9.1 |
| Third | EVA #3 | 1.0 |
| Fourth | PVDC/MA | 2.2 |
| Fifth | EVA #2 | 0.8 |
| Sixth | EVA#2 | 3.9 |
| Seventh | 90% EVA #2, and 10% HDPE | 1.3 |

In Table 8 above, "EVA #3 was ESCORENE® LD 720.92 ethylene/vinyl acetate copolymer which had a vinyl acetate content of 19 percent, a density of 0.940 g/cc, and a melt index of 1.5 g/10 min., and which was obtained from the Exxon Chemical Company of Baytown, Tex.

The "Standard Drop Test"

The Standard Drop Test was conducted as follows. First, boneless pork sirloin pieces were injected with a brine-based injection solution. The brine-based injection solution contained about 5 percent sodium chloride and about 1.1 percent phosphate. The boneless pork sirloin pieces were injected with the brine solution in an amount of about 11 percent, based on the weight of the boneless sirloin pieces.

About 4½ pounds of injected pork sirloin pieces were then placed in a test bag (preferably, an end-seal bag) having a lay-flat width of from about 8 to 9½ inches, and a length of about 18 inches. The seal area of the bag was kept free of brine/purge liquid by loading the meat into the bag using a loading horn. Then, from about 5 to 6 milliliters of the brine/purge solution was intentionally deposited on the seal area of the bag (i.e., a portion of the inside surface of the bag through which the seal was to be made), and was evenly dispersed onto the inside surface of the bag, in the area to be sealed. The brine/purge solution was prepared as follows: 500 milliliters of the brine solution, which was the same as the injection solution discussed above, as mixed with 500 milliliters of pork purge (i.e., blood) and 100 g of lean pork muscle. This mixture was then blended until liquefied, and was chilled to a temperature of from about 32° to 45° F. for at least 1 hour prior to use.

After the brine/purge solution was applied to the seal area of the bag, the bag was heat sealed using a Cryovac® 8600-B18 rotary chamber vacuum packaging machine. While in the Cryovac® 8600-B18 rotary chamber vacuum packaging machine, the atmosphere within the bag was evacuated to a level of about 2–3 torr, and while the bag was evacuated, it was closed around the product by heat sealing, the seal being made through that portion of the bag to which the brine/purge solution had been applied. The sealing parameters were as follows: seal voltage: 76 amps; seal time: 0.5 seconds, machine speed: 30 packages per minute. The seal was made within about 4 inches of the injected pork sirloin pieces. After sealing, the resulting package was shrunk in a Cryovac® BFT6570 E shrink tunnel which operated with a water temperature of 195° F. and a belt speed of 55 ft/min.

Five of the resulting packages were placed in a 15 inches wide, by 23½ inches long by 9 inches deep, with the box material (corrugated paper board) being about ⅛ inch thick. The box containing the 5 packages was then dropped from a height of 34' onto a level, flat, hard surface, so that the bottom surface of the box lands flat on the hard surface. After dropping, the five packages were removed from the box, inflated with air, and submerged in water to determine if the seal made from the Cryovac® R8600 B-18 packaging machine had failed, i.e., whether the seal was leaking. Any air bubbles which came from this seal indicated a leak.

A total of 50 replications were conducted in order to establish the performance criteria, i.e., the failure rate, which was reported in terms of the percent of the bags which exhibited leaking at the seal. In conducting the replications, no box was used (i.e., dropped) more than three times. Moreover, the sirloin pieces were used no more than 5 times, i.e., no more than 5 replications. The sirloin pieces were maintained at a temperature of from about 32° F. to 45° F. Between each replication the sirloin pieces were submerged in the brine solution for a minimum of 5 minutes before repackaging. The temperature of the brine solution was maintained between 32° F. and 45° F.

Results of Standard Drop Test for Films of Examples 5 through 13

TABLE 9

| Film of Example No. | Standard Drop Test (% leakers) |
|---|---|
| 5 | 36 |
| 6 | 34 |
| 7 | 36 |
| 8 | 26 |
| 9 | 32 |
| 10 | 36 |
| 11 | 30 |
| 12 (Comparative) | 86 |
| 13 (Comparative) | 66 |

The results set fourth in table 9, above, show that the films of Examples 5–11, when used in a Standard Drop Test, exhibited a percent leaker rate of from 26–36 percent. In contrast, the films of Examples 12 and 13, both of which are comparative examples, exhibited a percent leaker rate of 86 percent and 66 percent, respectively.

It is not completely understood why the films of Examples 12 and 13 did not performed as well in the Standard Drop Test as did the films of Examples 5–11. However, it is believed that if the film shrink in the shrink tunnel so that the seal (made through the brine-containing contamination) is forced too tightly against the meat product, the weakness of this seal will cause a higher percentage of such bags to fail during the Standard Drop Test. The film of Example 12

(Comparative) had a significantly higher free shrink and shrink tention in the direction perpendicular to the seal made through the contamination. Factors also believed to affect film performance in the Standard Drop Test include seal layer composition (homogeneous ethylene/alpha-olefin copolymer appeared to perform better), film thickness (thicker films appeared to perform better), film free shrink and shrink tention in the direction perpendicular to the seal made through the liquid (low free shrink and shrink tension appeared to perform better), amount and type of liquid in the area to be sealed (less liquid is better), type of meat product (include size, shape, meat species, etc), and presence or absence of bone in the meat product.

In the addition to the bags for carrying out the process of the present invention and making the package product of the present invention), the multilayer film can be a tubular casing, preferably a shirrable casing. Preferably, the casing is used for the packaging of food products, especially boneless meat products and processed meat products. Among the types of meat which can be packaged in the films and packages according to the present invention are poultry, pork, beef, sausage, lamb, goat, horse, and fish. Preferably, the casing of the present invention is used in the packaging of pork, poultry, beef, and sausage products.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

All ranges within all of the above-disclosed ranges are expressly included within this specification. Moreover, layers which are adjacent or directly adhered to one another are preferably of differing chemical composition, especially differing polymeric composition. All reference to ASTM tests are to the most recent, currently approved and published version of the ASTM test identified, as of the priority filing date of this application.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A packaged product comprising:
    (A) a boneless food product comprising at least one member selected from the group consisting of meat and cheese, the food product having an added liquid thereon, the added liquid comprising brine;
    (B) a flexible plastic film article which is both surrounding and in contact with both the food product and the added liquid, the film being heat sealed to itself, another film, or another article which is not a film, the film having a seal layer comprising homogeneous ethylene/alpha-olefin copolymer;
   wherein the packaged product exhibits a Standard Drop Test failure rate of less than 60 percent.

2. The packaged product according to claim 1, wherein the film article comprises a heat-shrinkable film.

3. The packaged product according to claim 1, wherein the packaged product exhibits a Standard Drop Test failure rate of less than 50 percent.

4. The packaged product according to claim 3, wherein the packaged product exhibits a Standard Drop Test failure rate of less than 40 percent.

5. The packaged product according to claim 1, wherein the food product comprises meat.

6. The packaged product according to claim 5, wherein the meat product comprises at least one member selected from the group consisting of pork and beef.

7. The packaged product according to claim 6, wherein the meat product comprises brine-injected pork.

8. The packaged product according to claim 1, wherein the brine is present in an amount of from about 1 percent to 30 percent, based on the weight of the product.

9. The packaged product according to claim 1, wherein the film article comprises a multilayer film having a thickness of from about 1.5 to 3 mils.

10. The packaged product according to claim 1, wherein the film article comprises a multilayer film having a free shrink of from about 15 to 60 percent in at least one direction.

11. The packaged product according to claim 1, wherein the film article comprises a multilayer film having a shrink tension of from about 50 to 350 psi in a first direction, and from about 300 to 1000 psi in a second direction.

12. The packaged product according to claim 1, wherein the packaging article comprises a multilayer film having an inside layer comprising at least one member selected from the group consisting of polyolefin, polyamide, polyester, polyvinyl chloride, and ionomer.

* * * * *